United States Patent [19]

Douglas

[11] Patent Number: 5,107,289

[45] Date of Patent: Apr. 21, 1992

[54] REFLEX CAMERA HAVING PIVOTABLE MIRROR

[75] Inventor: Lawrence M. Douglas, South Easton, Mass.

[73] Assignee: Polaroid Corporation, Cambridge, Mass.

[21] Appl. No.: 577,035

[22] Filed: Sep. 4, 1990

[51] Int. Cl.$^5$ .............................................. G03B 15/00
[52] U.S. Cl. .................................. 354/150; 354/158; 354/187
[58] Field of Search ............... 354/150, 152, 187, 189, 354/188, 190, 191, 192, 193, 194, 153, 154, 155, 156, 157, 158; 352/94

[56] References Cited

U.S. PATENT DOCUMENTS 1,979,719  11/1934  Weisse ................................ 354/410
4,508,440  4/1985  Costa et al. ....................... 354/187
4,723,140  2/1988  Whiteside et al. ............. 354/154 X Primary Examiner—L. T. Hix
Assistant Examiner—Howard B. Blankenship
Attorney, Agent, or Firm—Alfred E. Corrigan

[57] ABSTRACT

A foldable camera having a reflex mirror for redirecting image bearing light rays from the camera's lens to a film unit located in a cassette. An upper and lower housing interconnected by a flexible bellows are pivotally connected to one another for movement between a folded inoperative position and an erected operable position. When the upper housing is erected, the reflex mirror is simultaneously pivoted about an axis which is neither perpendicular to or parallel with the optical axis of the lens so as to dispose the mirror in an erected position permitting the camera to assume a low profile in the fully erected operable position.

8 Claims, 5 Drawing Sheets

REFLEX CAMERA HAVING PIVOTABLE MIRROR

RELATED APPLICATION

This application is related to my application Ser. No. 07/577,590 entitled FOLDING PHOTOGRAPHIC CAMERA OR SIMILAR ARTICLE filed on instant date herewith.

This invention relates to a folding reflex camera having a pivotable mirror for redirecting image bearing light rays passing through the camera's lens toward a film unit operably supported therein for exposure.

BACKGROUND OF THE INVENTION

The present invention relates to a folding or collapsible reflex camera of the type having a flexible bellows interconnecting an upper and lower housing which, in turn, are pivotally connected along substantially parallel edges for movement between a folded inoperative position and an erected operative position. Such cameras include a reflex mirror for redirecting or reflecting image bearing light rays passing through a lens to a film unit for exposure. A folding camera of this type is disclosed in U.S. Pat. No. 4,508,440. However, the reflex mirror therein pivots about an axis which is perpendicular to the optical axis of the lens, as is well-known in the art.

It is also known to dispose the pivot axis of a mirror of a reflex camera about an axis parallel to the optical axis of the camera lens. An example of this type of camera is disclosed in U.S. Pat. No. 1,979,719.

In cameras of the collapsible type, it is desirable to reduce the size or profile of the camera in both its inoperative and operative positions. The orientation of the pivotable mirror in such cameras affects the height profile of the camera as the upper housing must have a height dimension which is sufficient to accommodate the mirror in its fully erected operable position. The conventional location and orientation of the pivotable mirror in prior cameras of this type may result in a higher profile than is desirable, particularly in the erected operative position.

SUMMARY OF THE INVENTION

The present invention relates to a collapsible reflex camera having a pivotable mirror, and particularly to such a camera wherein the orientation of the pivot axis of the mirror provides for a low profile of the camera in its erected operative position. More specifically, the camera includes an upper and lower housing interconnected by a flexible opaque bellows. The upper and lower housings are pivotally coupled along generally parallel, longitudinally extending edges which are spaced from, but generally parallel to the optical axis of the camera's lens for movement between a folded inoperative or collapsed position and an erected operative position. The lower housing includes an open ended film chamber adapted to receive a film container and preferably a recess adapted to receive a portion of the upper housing when the upper housing is moved from the erected operative position to the folded inoperative position.

The second or upper housing includes means for supporting a lens and shutter assembly in a conventional manner. A mirror is pivotally supported within the second housing for movement into operative relationship to the lens and shutter assembly such that the optical axis of the lens intersects the plane of the mirror at an angle of incidence which will redirect image bearing light rays toward the film chamber where a film unit is supported by the film container within a plane for exposure.

According to the present invention, the pivot axis of the mirror is disposed at an angle which is neither perpendicular nor parallel to the optical axis of the lens. It is interrelated to the angle of pivotal movement between the first and second housing necessary to assume an erected operative position. This construction permits the mirror to be orientated so as to provide a low profile when erected in an operative position.

In a preferred embodiment described herein, the mirror has a conventional, well-known trapezoidal configuration. When the upper and lower housings are in the collapsed position, the mirror is pivotally supported within the second housing about a mirror pivot axis disposed at an oblique angle relative to the optical axis of the lens and in a plane generally parallel with that of the camera's focal plane. When the second housing is pivoted toward its erected position, about a generally longitudinally extending axis located in parallelism with the axis of the camera's objective lens, the mirror and lens assembly, which are mounted on a common support, move together therewith. The mirror also independently pivots under the bias of a spring about the mirror pivot axis to an erected operative position wherein its upper and lower parallel edges are disposed perpendicular to the optical axis of the lens. Upon returning the second housing to its folded inoperative position, means are provided to cause the mirror to pivot to its folded, inoperative position.

BRIEF DESCRIPTION OF DRAWINGS

For a fuller understanding of the nature and objects of the invention, reference should be had to the following detailed description taken in connection with the accompanying drawings wherein.

Figure 1:
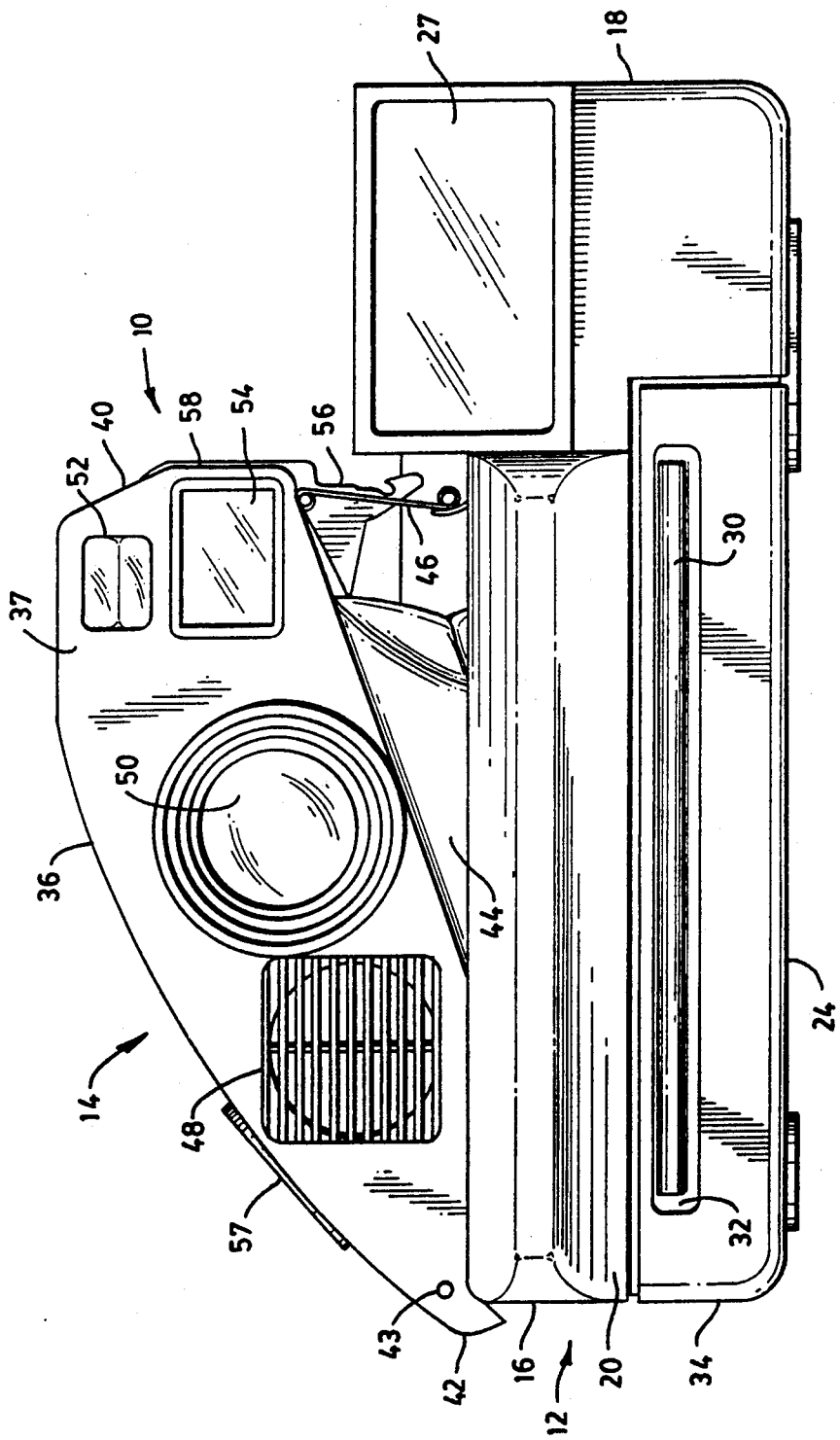
FIG. 1 is a front elevational view of a reflex camera in which this invention is embodied, shown in an erected operative position.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE INVENTION

Figure 2:
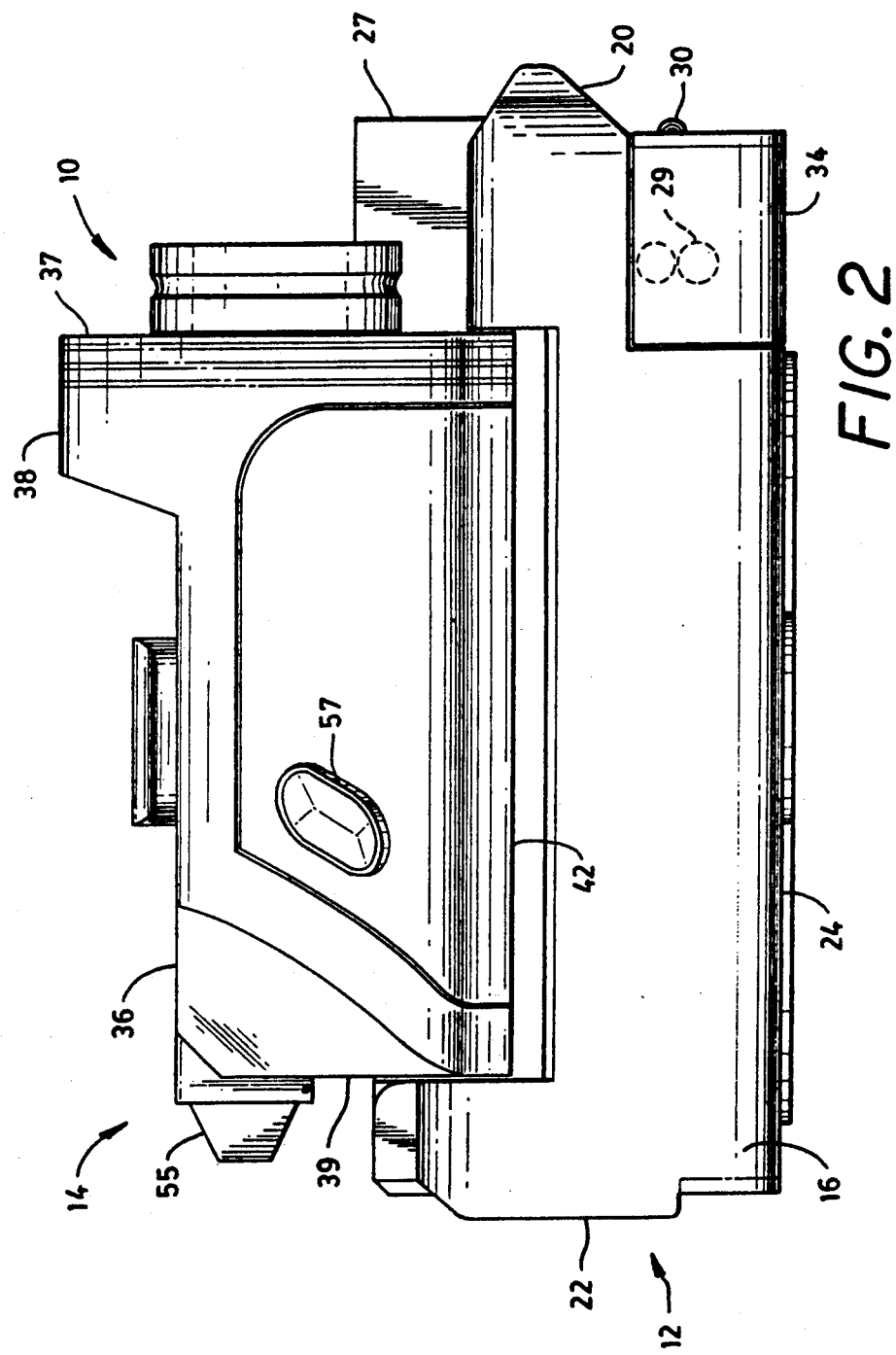
FIG. 2 is a side elevational view of the camera shown in FIG. 1.
Figure 3:
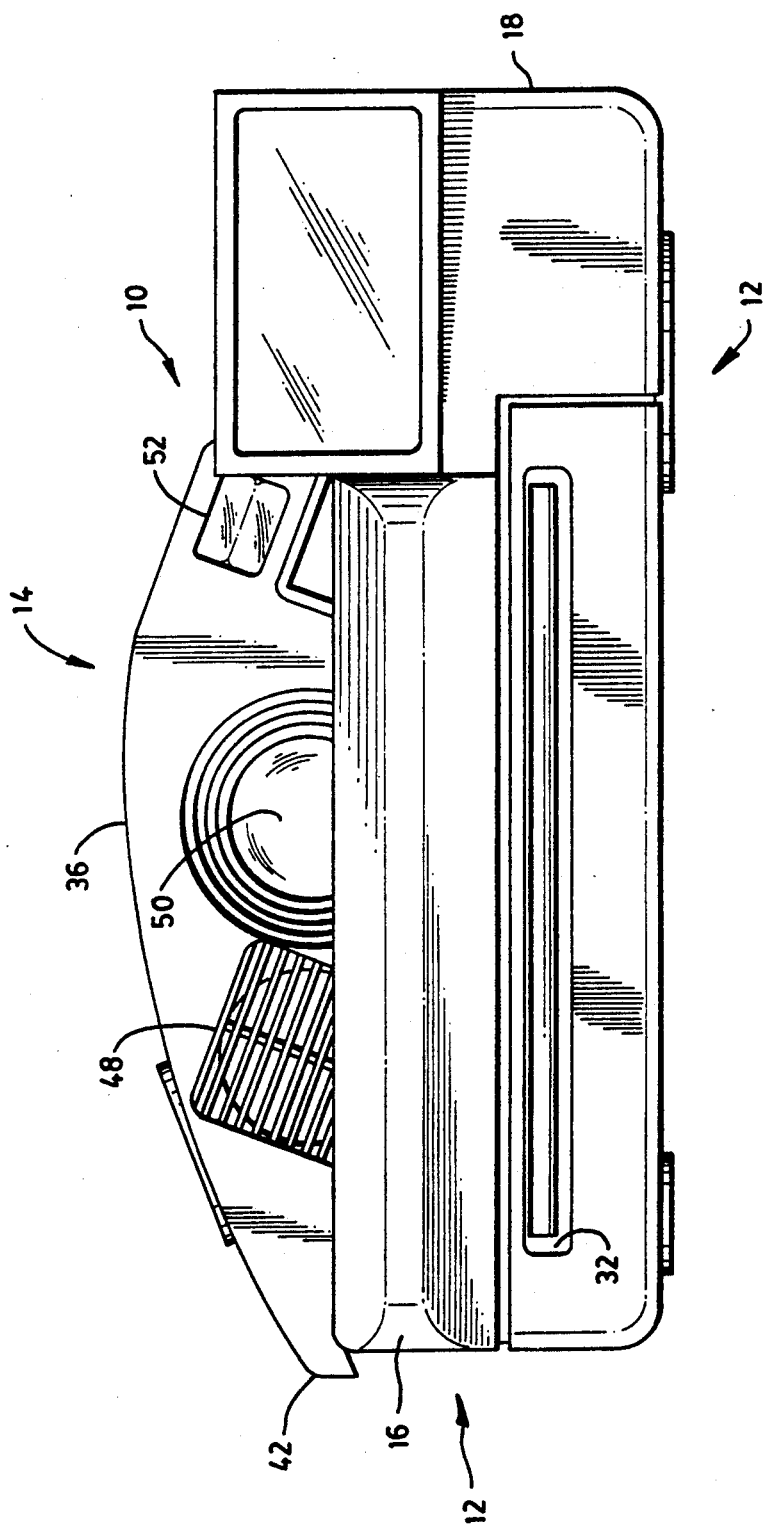
FIG. 3 is a front elevational view of the camera in a folded inoperative position.

With reference to FIGS. 1-3, a collapsible reflex camera 10 is shown. The camera illustrated, except as it relates to the pivotable mirror assembly and its longitudinally extending axis for pivotally coupling the camera's housings described in detail later herein, may be of conventional construction, well-known in the art, such as for example, the type illustrated and described in detail in U.S. Pat. No. 4,508,440. The specific structure and mechanisms for moving such a camera from a folded operative position to an erected inoperative position and its general photographic operation are therefore not shown or described herein. A full understanding of such detailed collapsible construction and operation to any extent necessary for a full understanding of this invention may be had by reference to the above-identified patent and similar cameras well-known in the art.

As shown in FIGS. 1-3, the camera 10 includes a lower or first housing 12 and an upper or second housing 14. Lower housing 12 is defined by a pair of side walls 16 and 18, a leading end wall 20, a trailing end wall 22 (FIG. 2) and a bottom wall 24, which together define an open ended film chamber for conventionally receiving a film cassette 26, such as illustrated isolated from the camera in FIGS. 4 and 5. As is well known in the art, a film unit (not shown) is adapted to be moved out of the film cassette 26, subsequent to exposure, via a slot 28, (FIG. 4) in a leading end wall of the cassette 26 and into the bite of a pair of rollers 29, in conventional fashion. The rollers 29 continue to advance the exposed film unit from the cassette 26 while simultaneously rupturing a container of processing liquid attached to a leading end thereof and spreading its contents between elements of the film unit so as to initiate the formation of a visible image therein. Further advancement of the film unit causes its leading edge to engage an opaque resilient sheet 30 such that it simultaneously uncoils and progressively covers the face of the film unit to prevent further exposure thereof as the film unit exits from camera 10 via a slot 32 in the leading end wall 20 of the first housing 12. Eventually, the opaque sheet 30 is completely uncoiled and releases its hold on the leading edge of the film unit. Sheet 30 then automatically recoils itself and returns to its original position, as shown in FIGS. 1-3. The rollers 29 are supported by a housing 34 which in turn is pivotally connected in any conventional manner to the remainder of housing 12 such that the roller housing 34 and its associated rollers 29 may be rotated in a clockwise manner, as viewed in FIG. 2, through approximately ninety degrees to expose the open end of the film chamber for loading and unloading the film cassette 26.

Lower housing 12 includes a recess, formed in part by upstanding portions of front and rear walls 20 and 22, which is adapted to receive a lower portion of the upper housing 14. Lower housing 12 also functions to support a strobe 27.

The upper housing 14 comprises a sloping top wall 36 provided with an upraised forwardly disposed portion 38, a front wall 37, a rear wall 39, and side walls 40 and 42. Upper housing 14 is pivotally coupled along an axis 43 (FIG. 1) parallel to side wall 42 in a conventional manner and is interconnected to the lower housing 12 via a flexible bellows 44 in a conventional manner, well-known in the art to permit the upper housing 14 to be erected or lowered between operative and inoperative positions as best seen in FIGS. 1 and 3, respectively.

Upper housing 14 is releasably supported in its erected operative position by an erecting assembly 46 which may comprise one or more links operatively connected to the upper and lower housings 12 and 14 in any suitable conventional fashion, such as an overcenter link assembly.

Fixedly mounted within the upper housing 14 and commonly pivoting therewith relative to lower housing 14, are a sonar type range finder 48, a lens and shutter assembly 50, a photocell 52 and a viewfinder window 54. An eyecup 55 is mounted on the rear wall 39 of the upper housing 14 and aligned with the viewfinder 54.

Preferably, the upper housing 12 is spring biased to pivot to the erected operable position shown in FIG. 1 and is releasably latched in a folded inoperative position via a latch mechanism 56 constructed in any conventional manner known in the art. A latch release 58 is provided and extends outwardly from the side wall 40 and is operatively connected to release the latch mechanism 56. Upper housing 14 also functions to mount a conventional shutter release button 57.

Figure 4:
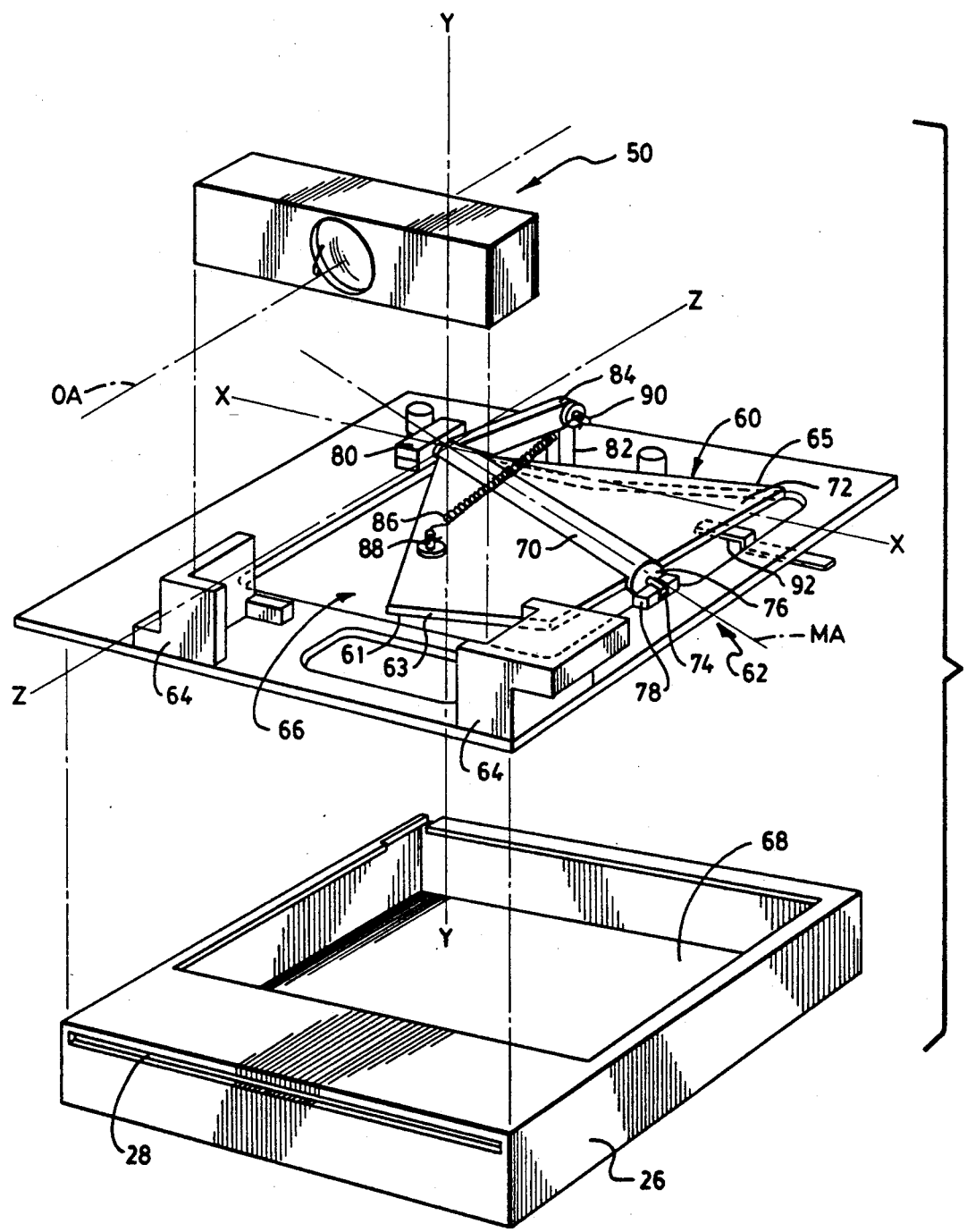
FIG. 4 is an exploded perspective view illustrating the mirror assembly and a film cassette when the camera is in a collapsed inoperative position.
Figure 5:
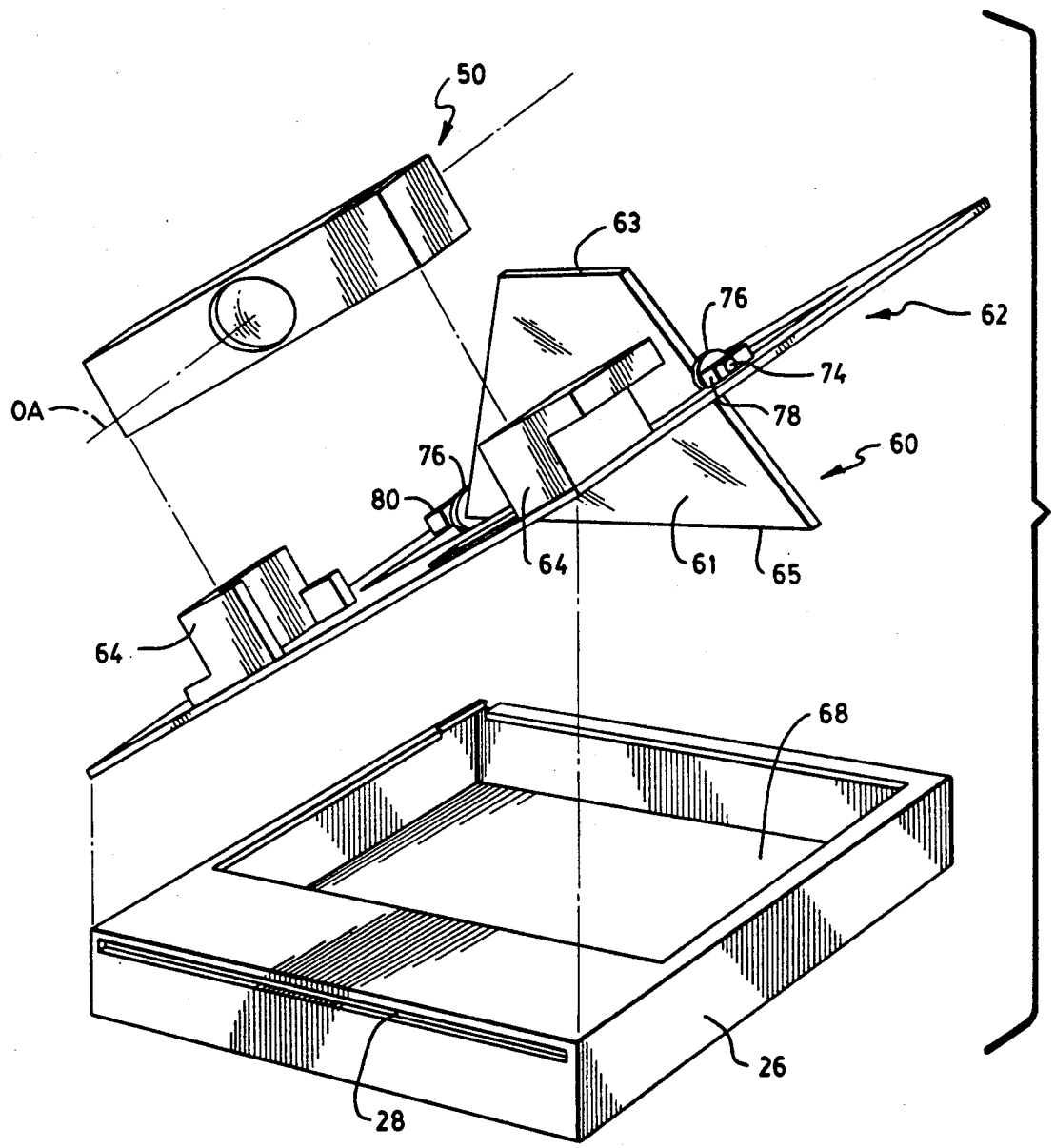
FIG. 5 is an exploded perspective view of those portions shown in FIG. 4 when the camera is in an erected operative position.

The general description above relates to the more conventional aspects of camera 10. With reference to FIGS. 4 and 5, a reflex mirror assembly is shown in exploded relationship to illustrate in detail the novel aspects of the present invention.

A trapezoidally shaped mirror assembly 60, pivotally connected to a mounting platform 62, is shown in a folded inoperative position in FIG. 4. Platform 62 is fixedly supported by the housing 14 to permit the platform 62 to commonly pivot in a fixed relationship therewith when the upper housing 14 is moved between the erected and folded positions described herein. Thus, the pivot axis for the platform 62 is the pivot axis 43 for the upper housing 14.

Platform 62 also functions to fixedly mount the lens and shutter assembly 50 between spaced mounting blocks 64 fixed to platform 62 such that the optical axis OA of the lens is substantially parallel to the pivot axis 43 of the second housing 14 and the platform 62. An opening 66 is provided in the platform 62 to permit image bearing light rays to pass through toward the film chamber in the lower housing 12 which supports the film cassette 26 containing film units for exposure. Film cassette 26 conventionally is provided with an exposure opening 68.

An element 70 is fixedly formed in the rear side 72 of mirror assembly 60 and is provided on its ends with circular collars 76. Each of the collars 76 includes an outwardly extending journal 74 which is rotatably supported within mounting blocks 78 and 80 fixedly mounted to the platform 62. Also provided on the platform 62 is a vertical arm 82 which is fixed to and carries a horizontal arm 84 which is adapted to be engaged by a rear side 72 of the mirror assembly 60. Arm 84 functions as a stop limiting the degree of pivotal movement of the mirror assembly 60 about the axis of the journals 74 between the desired erected operative and folded inoperative positions of the mirror assembly 60. The erected operative position of the mirror assembly 60 is defined when the optical axis of the lens intersects the plane of mirror assembly's mirror 61 at a selected angle of incidence, preferably 45 degrees, to direct image bearing light rays toward the film unit disposed in the film cassette 68. Mirror assembly 60 is biased toward the erected operative position, as shown in FIG. 5, via an erecting spring 86 fixed at one end to a post 88 mounted on the rear side 72 and at the opposing end to a second post 90 mounted on the horizontal arm 84.

As seen in FIG. 4, the pivot axis MA of the mirror assembly is aligned at an oblique angle relative to the optical axis OA, i.e., MA is skewed relative to OA. The axis MA is also disposed obliquely to the parallel top and bottom sides 63 and 65 of the trapezoidally shaped mirror 61. The sides 63 and 65 of the mirror 61 are preferably disposed obliquely to the optical axis OA when the mirror assembly 60 is in the folded inoperative position.

Upon pivoting of mirror assembly 60 about the axis MA in a clockwise direction to the erected operative position shown in FIG. 5, in combination with the pivoting of the platform 62 and the housing 14 about the axis 43 which is parallel to but spaced from optical axis OA, such as occurs when the housing 14 and the platform 62 are pivoted to an erected operative position, the mirror 61 is oriented to assume an erected operative position wherein the parallel top and bottom sides 63 and 65 are substantially horizontal when the camera 10 is held in the FIG. 1 position. This is effected by correlating the angle formed between the mirror pivot axis MA and the optical axis OA with the angle through which the housing 14 and hence the platform 62 pivot to assume the erected operative position represented in FIGS. 1 and 5.

The axes X, Y and Z are shown in FIG. 4, with the X axis representing one which is perpendicular to the camera's longitudinal axis Z and to the Y axis. The Z axis is parallel to the OA axis and to the pivotal connection 43 between the two housings 12 and 14. Preferably, the housing 14 is adapted to be rotated through an angle of approximately 20 degrees between its folded and erected positions. When the camera 10 is in the folded condition, as shown in FIGS. 2 and 3, the mirror assembly 60 lies in a plane substantially parallel with a plane containing the X and Z axes with its axis MA defining an angle of approximately 30 degrees with the X axis and an angle of approximately 60 degrees with the Z axis.

The mirror assembly 60 may be maintained in its inoperative position, against the bias of the spring 86, by a stop 92, diagrammatically shown in FIG. 4, which is fixedly secured to the housing 12 and extends upwardly through the opening 66 in the mirror assembly 60 into contact with the mirror 61. During the folding of the camera, the rear right hand corner of the mirror 61 moves into engagement with the stop 92 and further downward movement of housing 14 results in the mirror assembly 60 assuming the folded inoperative position shown in FIG. 4.

In view of the foregoing description it should be understood that a collapsible reflex type camera is provided having a mirror pivotable about an axis which is neither perpendicular nor parallel to the optical axis of the camera's lens to achieve a low profile of the camera in an erected operative position.

While certain preferred embodiments of the present invention have been disclosed in detail, it is to be understood that various modifications may be adopted without departing from the spirit of the invention or scope of the following claims.

What is claimed is:

1. A folding reflex camera comprising, in combination, a first housing defining a film chamber;

a second housing pivotally connected to said first housing for movement about a first axis between an erected operative position and a folded inoperative position;

a lens and shutter assembly fixedly supported in said second housing, said lens having an optical axis substantially parallel with said first axis; and a mirror mounted in said second housing for pivotal movement about a mirror pivot axis, which axis is skewed relative to said optical axis, said mirror being pivotable between a folded inoperative position and an erected operative position, said erected operative position defining a plane intersecting said optical axis at a selected angle of incidence to redirect image bearing light rays passing through said lens to a film unit operably supported in said first housing for exposure.

2. A folding reflex camera comprising, in combination, a first housing defining a film chamber;

a second housing pivotally connected to said first housing for movement between an erected operative position and a folded inoperative position;

a lens and shutter assembly fixedly supported in said second housing, said lens having an optical axis; and a mirror mounted in said second housing for pivotal movement about a mirror pivot axis, which axis is skewed relative to said optical axis, said mirror being pivotable between a folded inoperative position and an erected operative position, said erected operative position defining a plane intersecting said optical axis as a selected angle of incidence to redirect image bearing light rays passing through said lens to a film unit operably supported in said first housing for exposure, said mirror having a configuration including at least two opposing parallel sides disposed in a substantially horizontal relationship when said mirror is disposed in said erected operative position.

3. The camera defined in claim 2, wherein said configuration of said mirror is trapezoidal.

4. The camera defined in claim 2, wherein said mirror pivot axis is aligned obliquely to said opposing parallel sides of said mirror.

5. The camera defined in claim 2, wherein said opposing parallel sides of said mirror are aligned obliquely to said optical axis when said mirror is disposed in said folded inoperative position.

6. The camera defined in claim 1, further including means for moving said mirror to its folded position as said second housing is moving into its said folded position.

7. An improved low profile folding camera having a first housing defining a film chamber and a second housing interconnected to said first housing by a flexible bellows and means for pivotally coupling said second housing to said first housing for pivotal movement about a first axis between a folded inoperative position and an erected operative position, comprising, in combination;

a lens and shutter assembly fixedly supported in said second housing, said lens having an optical axis;

a mirror mounted in said second housing for movement with said second housing about said first axis, said first axis being parallel with but spaced from said optical axis, said mirror being pivotally mounted within said second housing about a second axis which is skewed relative to said optical axis between an erected operative position and a folded inoperative position;

said erected operative position of said mirror defining a plane intersecting said optical axis at a selected angle of incidence to redirect image bearing light rays passing through said lens toward said film chamber in said first housing; and a film unit supported in said film chamber in said second housing and disposed to operatively receive said image bearing light rays for exposure.

8. A folding reflex camera comprising, in combination, a first housing defining a film chamber;

a second housing pivotally connected to said first housing for movement between an erected operative position and a folded inoperative position;

a lens and shutter assembly fixedly supported in said second housing, said lens having an optical axis, and said first and second housing are pivotally connected about a pivot axis substantially parallel with said optical axis; and a mirror mounted in said second housing for pivotal movement about a mirror pivot axis, which axis is neither perpendicular to nor parallel with said optical axis, said mirror being pivotable between a folded inoperative position and an erected operative position, said erected operative position defining a plane intersecting said optical axis as a selected angle of incidence to redirect image bearing light rays passing through said lens to a film unit operably supported in said first housing for exposure.

* * * * *